(12) United States Patent
Biester

(10) Patent No.: US 8,141,718 B2
(45) Date of Patent: Mar. 27, 2012

(54) SEPARATION DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 1050 days.

(21) Appl. No.: 10/598,135

(22) PCT Filed: Mar. 9, 2004

(86) PCT No.: PCT/EP2004/002417
§ 371 (c)(1),
(2), (4) Date: Aug. 18, 2006

(87) PCT Pub. No.: WO2005/084775
PCT Pub. Date: Sep. 15, 2005

(65) Prior Publication Data
US 2007/0138085 A1 Jun. 21, 2007

(51) Int. Cl.
*B01D 21/26* (2006.01)
*E21B 43/00* (2006.01)

(52) U.S. Cl. ............... 210/512.1; 210/513; 210/519; 210/521; 166/105.5; 166/357

(58) Field of Classification Search .......... 494/25, 494/31, 37, 44; 210/512.1, 512.2, 513, 782, 210/784, 781, 788, 304, 360.1, 360.2, 377, 210/416.1, 433.1, 437, 438, 440, 441, 519, 210/521, 522, 532.1, 533, 537, 540, 787, 210/800, 172.1, 172.5; 209/725, 726; 55/451, 55/452, 459.1, 459.3; 95/34; 96/208, 209, 96/216, 183; 166/357, 105.5
See application file for complete search history.

(56) References Cited

U.S. PATENT DOCUMENTS

| | | | | | |
|---|---|---|---|---|---|
| 1,400,622 | A | * | 12/1921 | Nordell | 210/788 |
| 1,648,607 | A | * | 11/1927 | Brown | 210/109 |
| 2,355,875 | A | * | 8/1944 | Lasseter | 210/790 |
| 2,488,851 | A | * | 11/1949 | Copp | 210/261 |
| 2,678,699 | A | * | 5/1954 | Fowler | 96/171 |
| 2,893,510 | A | * | 7/1959 | Spann | 96/211 |
| 2,967,618 | A | * | 1/1961 | Vane | 209/135 |
| 3,171,807 | A | * | 3/1965 | Neuman | 210/319 |
| 3,252,574 | A | * | 5/1966 | De Koning et al. | 209/457 |
| 3,318,073 | A | * | 5/1967 | Adkins | 96/211 |
| 4,438,817 | A | * | 3/1984 | Pokladnik et al. | 166/341 |
| 4,626,237 | A | * | 12/1986 | Galloway, Jr. | 494/37 |
| 5,004,552 | A | * | 4/1991 | Al-Yazdi | 210/789 |
| 5,227,061 | A | * | 7/1993 | Bedsole | 210/304 |

(Continued)

*Primary Examiner* — Tony G Soohoo
*Assistant Examiner* — David C Mellon
(74) *Attorney, Agent, or Firm* — Chamberlain, Hrdlicka, White, Williams & Aughtry

(57) ABSTRACT

A separation device for the separation of constituents of different density, in particular of a fluid fed from a well hole, exhibits a container in which the fluid at least partially after entry via a feed line is separated into its constituents using centrifugal force in the radial direction and/or using gravitational force in the vertical direction. To improve this type of separation device such that it can be constructed more compact and in a constructively more simple manner and also that it simultaneously can reliably enable separation of all constituents and their removal from the separation device, a classifier device is arranged in a lower section of the container interior, which at least exhibits one discharge line, extending radially outwards, for the discharge of the fluid into the container interior and delivery lines, joined to the container interior at different levels in the vertical direction, for the separated fluid constituents.

34 Claims, 6 Drawing Sheets

U.S. PATENT DOCUMENTS

| | | | | |
|---|---|---|---|---|
| 5,248,421 A * | 9/1993 | Robertson | ................. | 210/512.1 |
| 6,197,095 B1 * | 3/2001 | Ditria et al. | ..................... | 95/248 |
| 6,346,069 B1 * | 2/2002 | Collier | ............................. | 494/3 |
| 6,919,034 B2 * | 7/2005 | Kozak, III | ..................... | 210/799 |
| 6,966,987 B1 * | 11/2005 | Morgan et al. | ................ | 210/279 |
| 2005/0189293 A1 * | 9/2005 | Bernard | ........................ | 210/519 |

\* cited by examiner

SEPARATION DEVICE

CROSS-REFERENCE TO RELATED APPLICATION

The present application claims priority to PCT/EP2004/002417 filed 9 Mar. 2004 hereby incorporated herein by reference.

BACKGROUND OF THE INVENTION

The invention relates to a separation device for the separation of constituents of different density of a fluid, in particular of a fluid fed from a well hole, with a container in which the fluid is separated, at least partially after entering via at least one feed pipe, by centrifugal force in the radial direction and/or by the force of gravity in the vertical direction into its constituent parts.

This type of separation device is, for example, known from WO 99/25464. In this method a gravity classifier is used for separating different constituents of a conveyed fluid in layers, in particular into gas, water and mineral oil constituents. The various constituents are then conveyed away separately. At an upper end of an appropriate container of the classifier, a so-called cyclone separation device is also arranged through which the gaseous and liquid constituents are separated and then the latter are fed to the gravity classifier with an appropriate container.

The object of the invention is to improve a separation device of the type mentioned at the start such that it is constructed more compactly and in a simple manner and at the same time reliably enables the separation of all constituent parts and their delivery out of the separation device.

This object is solved by the following features, namely a separation device for the separation of constituents of different density, in particular of a fluid fed from a well hole, with a container in which the fluid at least partially after entry via at least one feed line is separated into its constituents using centrifugal force in the radial direction and/or using gravitational force in the vertical direction, characterized in that a classifier device is arranged in a lower section of the container interior, which at least exhibits one discharge line, extending in the radial direction outwards for the discharge of the fluid into the container interior and delivery lines, joined to the container interior at different levels in the vertical direction for the separated fluid constituents.

BRIEF SUMMARY OF THE PREFERRED EMBODIMENTS

According to the invention, the feed of the fluid occurs directly in a lower section of the container interior, whereby in this section the fluid is fed with a radial motion component to cause a separation due to the centrifugal force. Following the feed or also already during the separation due to the centrifugal force, separation occurs due to the force of gravity, so that the different constituents are arranged vertically one above the other, layered in the container. The feed with a motion component in the radial direction occurs via a least one discharge line, which extends outwards in the radial direction and which opens into the container interior. To then deliver the constituents of the fluid, separated from one another in layers using centrifugal force and the force of gravity, out of the container interior, appropriate delivery lines for the separated fluid constituents are connected to the container interior at different levels in the vertical direction. This enables each fluid constituent to be delivered separately.

Through the application of such separate delivery lines, each fluid constituent cannot only be delivered separately, but also controlled with regard to quantity. This is particularly of advantage when, for example, fluid from different well-holes, for which the proportions of the fluid constituents are different, is passed to the separation device. This means that, for example, more or less water per unit time, more or less gas, more or less sand and also more or less mineral oil can be delivered depending on the fluid fed.

A simple method of arranging the discharge line can be realised in that it is formed at least adjacent to its discharge opening approximately spiral shaped. Due to the spiral shape the radial motion component is also transferred to the fluid discharged into the container interior, the said motion component initiating a separation of the fluid constituents in the radial direction due to the centripetal or centrifugal force which occurs. Simultaneous to this separation and also following this separation, separation then occurs in the vertical direction due to the force of gravity.

To be able to arrange the discharge line in a simple manner within the container, it can extend from a vertical pipe of the separation device arranged essentially centrally in the container. This vertical pipe can extend over the complete height in the container interior, so that it is particularly releasably connected to the container at the top and bottom.

To supply the discharge line with sufficient fluid which is passed from the well-hole under high pressure, a fluid feed line, from which the fluid reaches the discharge line via the pipe interior, can terminate within the vertical pipe.

In order to use the vertical pipe not only for feeding fluid or crude oil, the vertical pipe can be subdivided in the longitudinal direction into a number of pipe sections which are separated from one another, whereby the fluid line terminates in a first lower pipe section and the discharge lines with their entry ends are arranged in each case above further pipe sections arranged above the first pipe section. In this way the vertical pipe provides both feed of the fluid as well as delivery of the fluid constituents after conclusion of the separation. The corresponding pipe sections are here formed with sufficient length so that on one hand the corresponding entry end of the delivery line is arranged in the area of only one fluid constituent and on the other hand to be able to deliver the fluid constituents sufficiently quickly.

To be able to feed the fluid constituents in this respect to the various pipe sections in a simple manner, entry openings in the pipe casing of the vertical pipe can be formed at least in the area of the further pipe sections. These can exhibit various shapes and are advantageously arranged along the circumferential direction of the vertical pipe. Depending on the height of the pipe sections, these entry openings can be arranged one above the other also in the vertical direction.

As already mentioned at the start, the fluid constituents can, for example, be delivered in different amounts over time by different throttling of the delivery lines. Another adaptation to different quantities of fluid constituents can take place in that the pipe sections exhibit different lengths, whereby in an advantageous manner this length can be realised variably.

For the separation of the pipe sections from one another, there is the possibility that they are separated by appropriate intervening bottoms.

In order to be able to feed fluids essentially in a type of double screw-shaped motion, two approximately coil-shaped discharge lines running radially outwards and vertically upwards can extend from the vertical pipe. Here, the two discharge lines run in the same direction so that the corresponding fluid is fed via both discharge lines essentially at the same speed to the container interior.

In order to enable separation using centrifugal force already during the circulation of the fluid through the discharge lines, the discharge lines can exhibit a number of openings, in particular on their outer side essentially in the radial direction. The openings can in this respect also be aligned such that they are open in a direction given by vectoral addition of the occurring centrifugal and gravitational forces for the fluid in the region of the opening. The shape of the openings can be selected appropriately, whereby circular, oval, star, slot or other opening shapes are conceivable.

For the stabilisation of the discharge lines, the classifier device can exhibit at least one blade segment protruding radially outwards from the vertical pipe. This can also be used for the prevention of further turbulence in the fluid, in particular after separation into corresponding fluid constituents in the region of the blade segments.

In order to be able to mount the discharge lines in a simple manner on the blade segment, it can exhibit openings for the accommodation and/or fitting of the discharge line.

Preferably, the openings can be arranged along an end section of the blade segment situated radially outwards. There is also the possibility that the openings are formed as partially open edge recesses in the blade segment.

To enable simple delivery of the fluid constituents, the delivery lines can exhibit within the vertical pipe essentially vertically running line sections which are connected to at least one rotary slide valve. Using the rotary slide valve the amount of the fluid constituents passed via the corresponding line sections can be varied or also the delivery can be interrupted.

Following the rotary slide valve, the corresponding line sections can be connected via an, in particular electrical, multibore connector with transport lines for the further transport of the fluid constituents. Through this transport line, the fluid constituents can be transported for further processing, for on-going transport to the sea surface, for return to the well hole or for transport to a reintroduction hole.

The rotary slide valve and multibore connector can also be used simultaneously for the fluid feed line, whereby it can then be connected to a fluid well-hole line feeding the fluid from the well hole.

In order to be able to separately control the flow for each transport line, flow control valves, in particular electrical, can be arranged in them.

For the further monitoring and control of the fluid constituents, throttle devices and/or metering valves can be connected to the flow control valve.

In order to be able to monitor the filling level within the container due to the various fluid constituents at any time, appropriate level sensors can be arranged on each pipe section. These can react specifically to the corresponding fluid constituent and, for example, determine whether, where applicable, a fluid constituent has reached a pipe section to which it is not assigned for discharge. In addition, the level sensors can also be used for emergency signals when, for example, a blockage or similar problem occurs in the classifier or in the separation device.

A filling level measurement can, for example, also occur using a sensor device which is assigned to an upper end of the container interior and/or pipe interior. A gaseous constituent of the fluid collects in the upper end, whereby, for example, the pressure prevailing in this gaseous constituent can be acquired.

According to the invention, there is a particular advantage when at least one feedback line is provided between the separation device and the well hole or a feedback hole. Various fluid constituents can be fed back to the extraction region of the crude oil using this feedback line to provide, for example, compensation for material and/or pressure. The corresponding fluid constituents are in particular sand or other solid contaminants of the crude oil and water. There is also the possibility of feeding back the gaseous constituent of the fluid.

For maintenance or cleaning of the separation device, it can prove to be advantageous if it is arranged as a replaceable part of a so-called tree on the sea bed. Here, it is sufficient if, for example, the container is transported, where applicable, with the rotary slide valve and multibore connector to the surface of the sea.

The separation device can be releasably mounted on the corresponding tree frame, or it can exhibit its own frame structure for mounting the container and lines, pumps, valves or similar equipment. Then, for example, the separation device can also be transported to the sea's surface together with the frame structure. There is also the possibility that the frame structure is formed separable, so that only an appropriate part of the frame structure is replaced with the parts fastened to it.

For the control of the separation device and its constituent parts, an appropriate control line can be laid to the surface of the sea so that the separation device is essentially remote controlled. There is also the possibility of connecting the separation device to an electrical supply and control unit, in particular one which is already in place locally. It is then connected, for example, via a coaxial cable for the interchange of information and for the power supply to a remotely situated control station.

In order to be able, where necessary, to feed fluid to different separation devices or to pass fluid to another point without feeding it to the separation device, at least one, in particular electrical, changeover valve can be positioned in the fluid well-hole line. With this, the fluid connection to the separation device can be interrupted.

If, for example, the separation device fails, this changeover valve can, where necessary, be used in conjunction with a further changeover valve to bypass the separation device and to convey the fluid directly via an appropriate pipeline of the bypass pipeline to the sea's surface. Consequently, it is ensured that also when the separation device fails, no interruption of the fluid transport is necessary.

Various shapes for the container of the separation device are conceivable. Due to the arrangement of the discharge line or lines is has been found to be of advantage when the container is essentially spherical or silo-shaped. Silo-shaped here is taken to mean an approximately cylindrical container with spherical caps arranged at both its ends.

In order to be able to replace, where necessary, at least the container of the separation device in a simple manner, it can be constructed in a modular manner. This means that the container can be removed complete from the separation device or also, for example, only an upper and/or lower container half. Similarly, there is also the possibility that, due to the modular construction of the container in a simple manner, one container shape can be converted into another container shape. The modular construction relates in a similar manner also to an appropriate frame of the separation device or to parts arranged in the container, such as, for example, classifier devices. Also, these various parts can all be removed separately where necessary and replaced by other parts.

BRIEF DESCRIPTION OF THE DRAWINGS

In the following, advantageous embodiments of the invention are explained in more detail based on the figures in the enclosed drawing.

The following are shown.

DETAILED DESCRIPTION OF THE PREFERRED EMBODIMENTS

Figure 1:
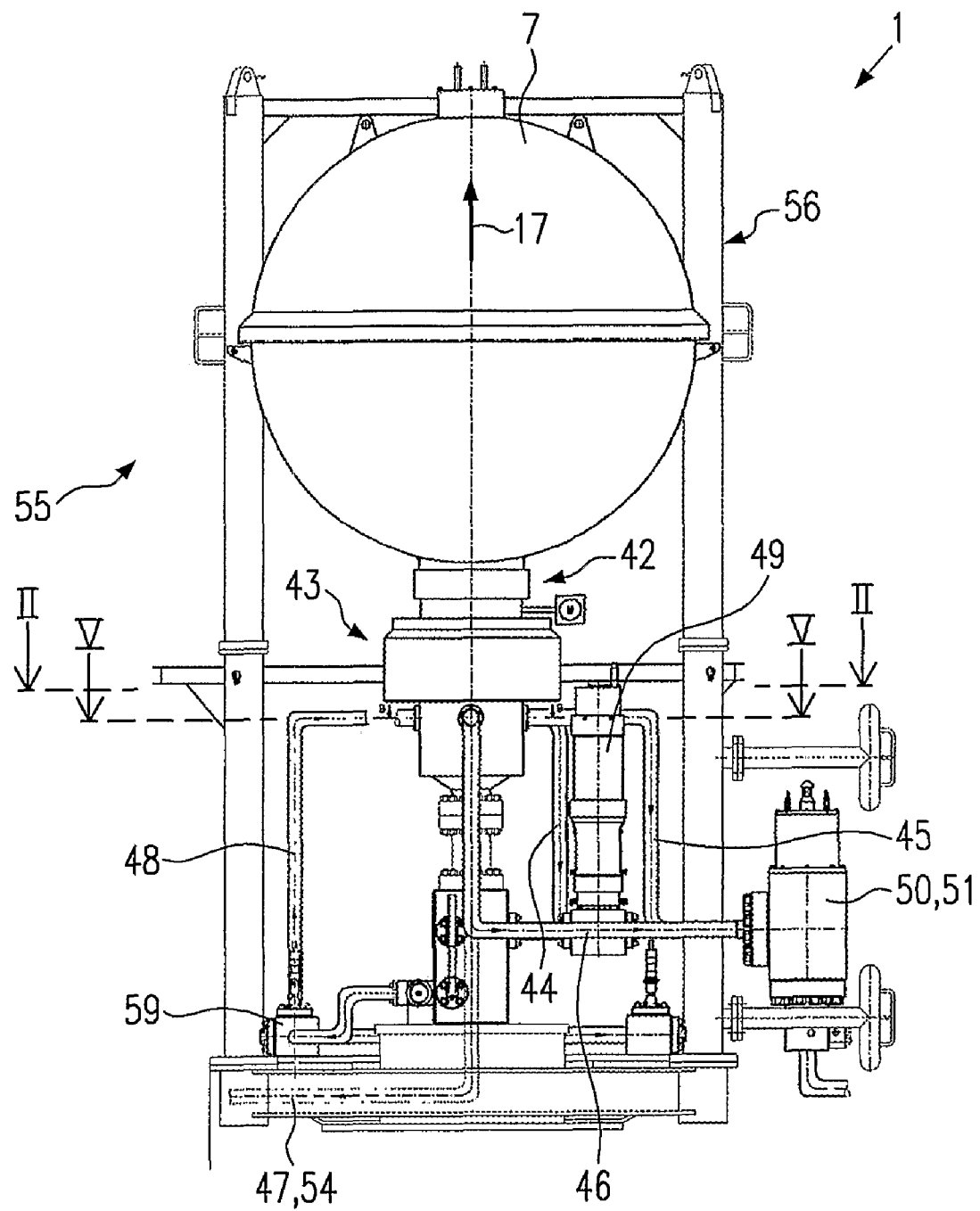
FIG. 1 a side view of a first embodiment of a separation device according to the invention.
Figure 3:
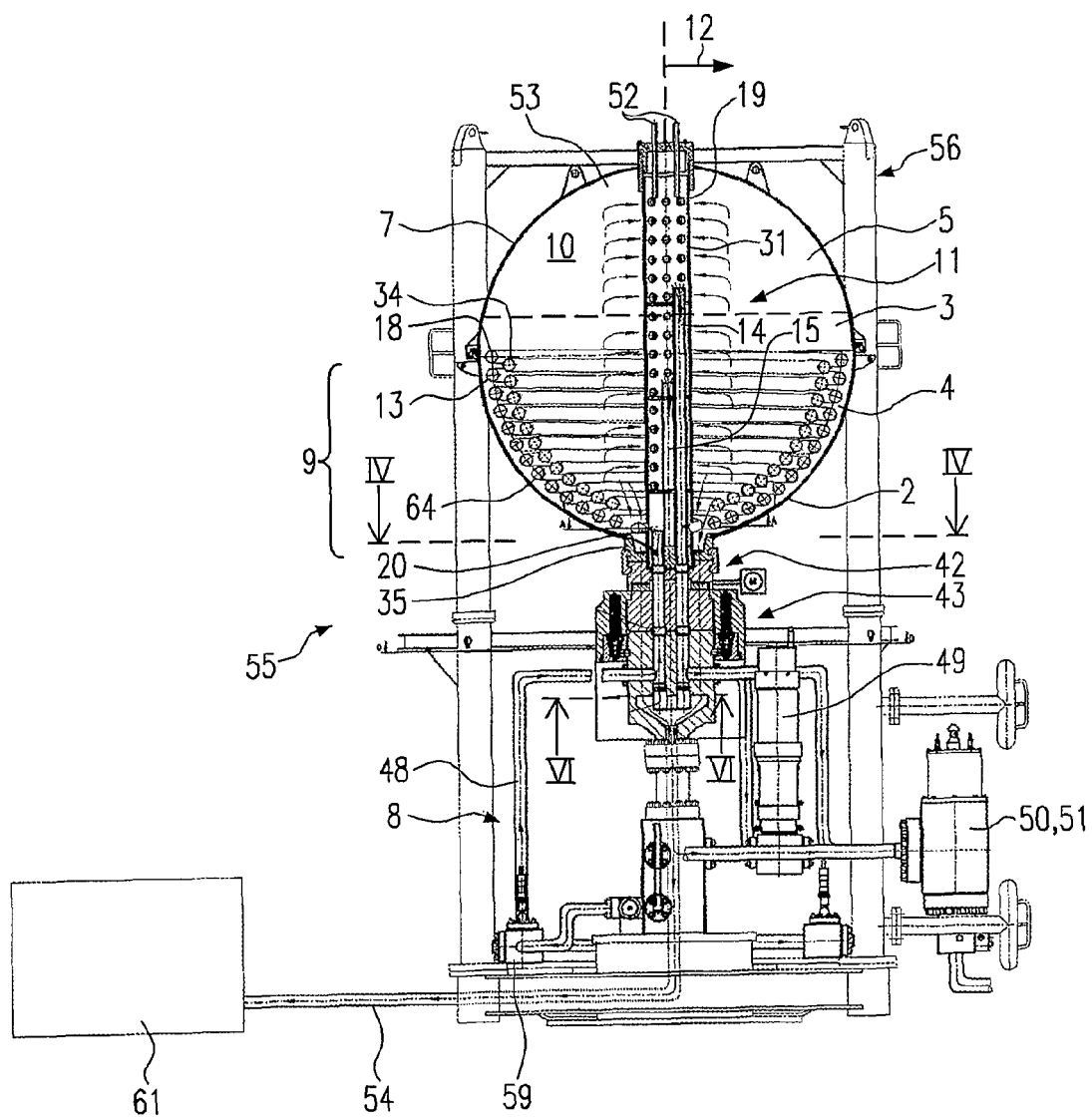
FIG. 3 a longitudinal section through the device according to FIG. 1.

FIG. 1 shows a side view of a first embodiment of a separation device 1 according to the invention. This exhibits a spherical container 7 which is releasably composed of two hemispheres. In the lower hemisphere in FIG. 1 a classifier device 11, see also FIG. 3, is arranged. The container 7 is arranged in a frame structure 56 which is part of a tree 55. The frame structure can in this respect also be formed of many parts and be capable of being dismantled, so that, for example, container 7 can be transported with the associated part of the frame away from the sea bed.

Below on the container 7 rotary slide valves 42 and a multibore connector 43 are connected. A row of lines are arranged below the multibore connector 43, on one hand for feeding the fluid to be separated into its constituents, see fluid well-hole line 48, and on the other hand for removing the separated constituents, see lines 44, 45 and 46. In addition, another transport line 47 is formed as a feedback line 54, through which sand and water can be fed back as separate constituents to a tree 61 for reinjection into the extraction region of the fluid, see also FIG. 2. From below in FIG. 1, the fluid is fed, via an appropriate fluid well-hole line 48, see also FIG. 9. Parts of the fluid well-hole line 48 are illustrated in FIG. 1, whereby they extend between the actual separation device 1 and a changeover valve 59. Together with another changeover valve 59, see FIG. 2, this changeover valve 59 is used either for feeding the fluid to the separation device 1 or to the bypass of the separation device 1 and for the direct feed of the fluid to an appropriate pipeline, for example, refer to FIG. 9.

Within the container 7 the various fluid constituents are arranged essentially in layers one above the other in the direction of the vertical height 17. The fluid constituent with the highest density is positioned on the container bottom and the other constituents are positioned above this constituent in layers corresponding to their density. Apart from a division into layers or separation into fluid constituents due to the force of gravity, separation due to centrifugal or centripetal force also occurs due to the separation device 1 according to the invention.

Figure 2:
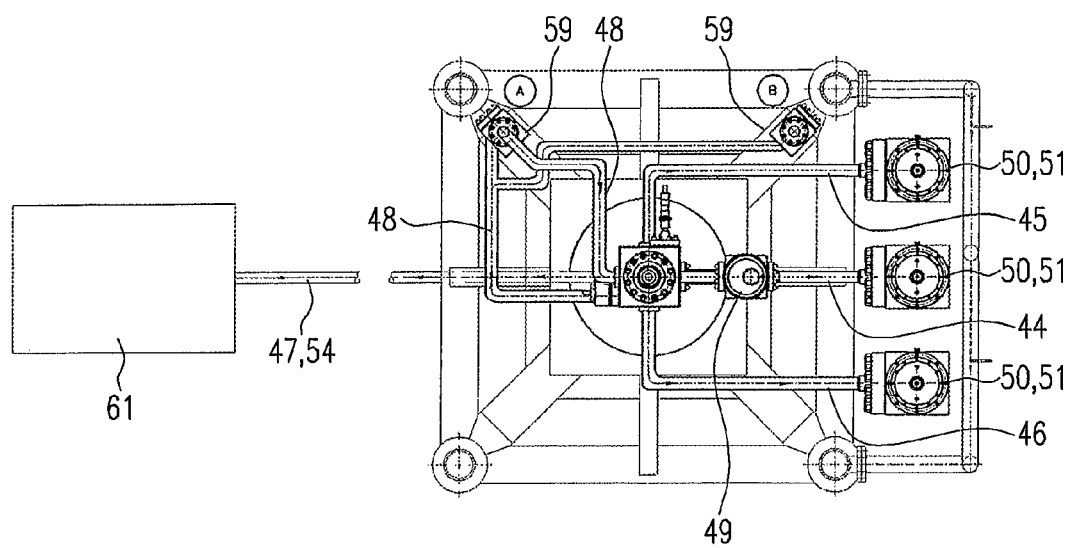
FIG. 2 a section along the line II-II from FIG. 1.
Figure 9:
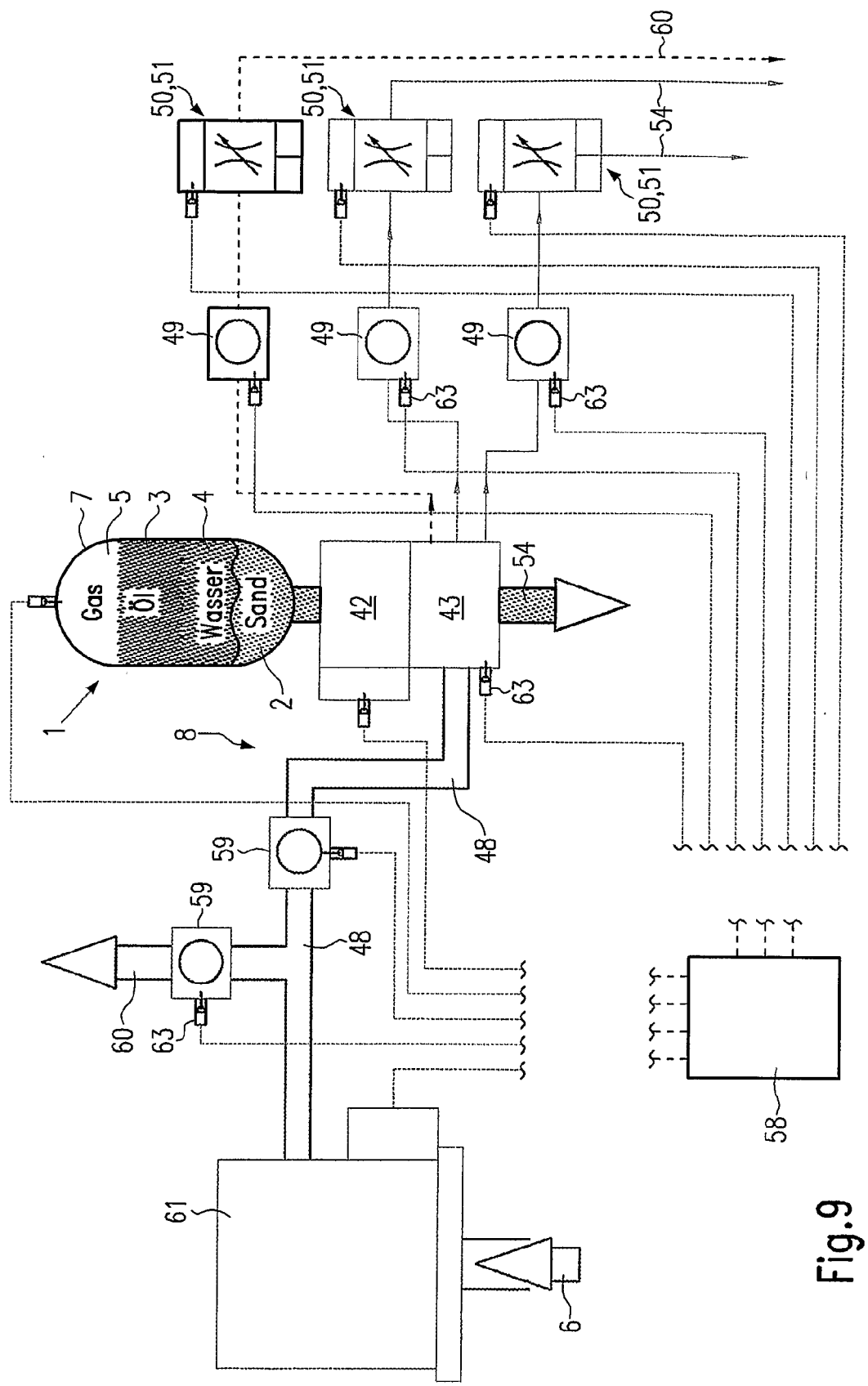
FIG. 9 a schematic illustration of a function diagram for the separation device according to the invention.

FIG. 2 corresponds to a section along the line II-II from FIG. 1. In this illustration the various lines for feeding the fluid and for removing the separated fluid constituents can in particular be seen. As already stated, the fluid, for example crude oil, is passed to the separation device 1 according to FIG. 1 and then, according to FIG. 2, to a first changeover valve 59 with an essentially L-shaped section of the fluid well-hole line 48. From here, the fluid is passed back to the separation device 1 for separation into the appropriate fluid constituents. Directly in front of the changeover valve 59 the fluid well-hole line 48 exhibits a branch which leads to another changeover valve 59. If this other changeover valve 59 is open and the other changeover valve closed, the separation device 1 is bypassed and a direct feed of the fluid to an appropriate pipeline 60, see also FIG. 9, is possible without separation into the fluid constituents.

The various transport lines 44, 45, 46 and 47 for the fluid constituents exhibit the throttle device 50 and/or metering valves 51 and, where necessary, also a flow control valve 49. In the illustrated embodiment the removal of gas occurs via the transport line 44 and oil, water and sand/water are removed via the other transport lines 45, 46 and 47. Apart from the oil, all constituents can be fed back to the extraction region of the fluid and are injected there under pressure, in particular for material and pressure compensation.

FIG. 3 shows a longitudinal section through the separation device 1 according to FIG. 1. In this figure, as in further figures, the same components always have the same reference symbols, whereby these are only partially mentioned.

Figure 8:
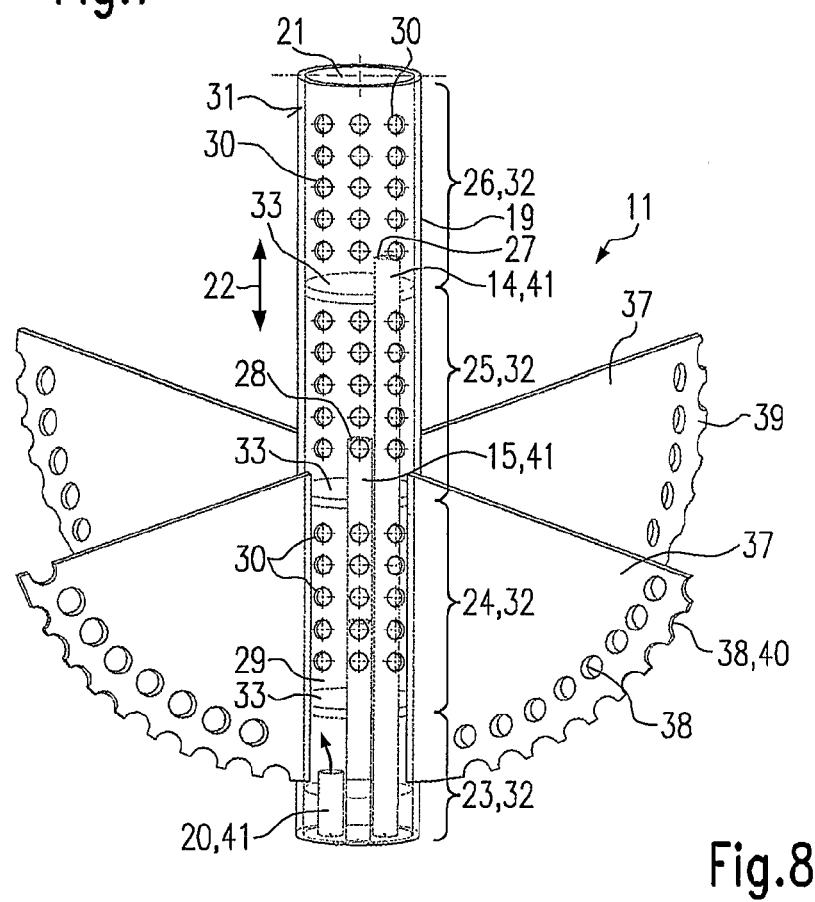
FIG. 8 a classifier device for application in the embodiment according to FIG. 3.

A classifier device 11 is arranged within the container 7. This exhibits a vertical pipe 19 extending in the vertical direction centrally in the container 7 which is essentially hollow. A large number of entry openings 30 are arranged within an appropriate pipe casing 31 both in the circumferential direction as well as in the vertical direction 22, see also FIG. 8, of the vertical pipe 19. The pipe interior 21, see also FIG. 8, is subdivided into different pipe sections 23, 24, 25 and 26. The pipe section 23 is the lowest pipe section and the other pipe sections are arranged one above the other in the longitudinal direction. Each pipe section is assigned to a corresponding fluid constituent. This fluid constituent enters the pipe interior 21 through the corresponding entry openings 30 and can be removed from there by appropriate delivery lines 14, 15 and 16. The delivery lines exhibit appropriate entry ends 27, 28 and 29, see also FIG. 8, which are in each case assigned to one of these pipe sections 24, 25, 26. Apart from the vertical pipe 19, the classifier device 11 in the container interior 10 also exhibits a range of blade segments 37 which extend radially outwards from the vertical pipe 19. According to FIG. 8, the various blade segments 37, of which in the illustrated embodiment four are arranged in each case spaced about 90° in the circumferential direction, exhibit a row of openings 38. These are arranged along an edge region 39 of the various blade segments 37. The openings 38 are used for the accommodation and/or mounting of the first discharge line 13 and the second discharge line 34. These discharge lines extend essentially radially outwards and vertically upwards with the shape of a spiral away from the vertical pipe 19, see also, for example, FIG. 4. The two discharge lines are passed through the openings 38 or through the openings 38 formed as edge recesses 40 and are mounted there.

In FIG. 8 it can be seen in particular that the various pipe sections 23, 24, 25, 26 are separated by several intervening bottoms 33. Through the separation of two adjacent intervening bottoms 33 a length 32 of each pipe section is essentially determined. The length of the pipe sections can be varied by moving the intervening bottoms 33.

In FIG. 3 it can also be seen that the classifier device 11 is essentially arranged only in the lower section 9 of the container 7. Here, a certain amount of separation of the fluid constituents occurs due to the acting centrifugal or centripetal force due to the spiral-shaped arrangement of the appropriate discharge lines. On their outer side in the radial direction, the discharge lines 13, 34 exhibit openings 64 through which the fluid constituent with the greatest density or fluid constituents with the greatest densities already exit from the discharge line into the container interior 10. The number and arrangement of the openings can be selected depending on the type of fluid, type of fluid constituents, fluid pressure or similar parameters. Appropriate openings 64 can be aligned, for example, with their opening such that it is open in a direction given by the direction of the resulting force vector of the centrifugal and gravitational forces at the specified point in each case.

At the upper end 53 of the container interior 10 or of the pipe interior 21, sensor devices 52 are arranged. Using these, it can be found, for example, whether gas is already present as constituent 5, the type of gas can be determined and, where applicable, with which pressure or temperature the gas is present.

Further level sensors, which are assigned to the various pipe sections for the various fluid constituents are not illustrated in FIG. 3 for the sake of simplification.

A fluid line 20, through which the fluid is passed to the separation device 1 under high pressure, opens into the lower end of the vertical pipe 19. The fluid exits in the corresponding pipe section 23 and is fed there to the discharge lines 14, 34. All pipes of the lines within the vertical pipe are brought out at its lower end through rotary slide valves 42 and multibore connectors 43, to be connected on one hand to appropriate fluid well-hole lines 48 for the feed of the fluid and on the other hand to the corresponding transport lines 44, 45, 46, 47 for delivering the fluid constituents.

Figure 4:
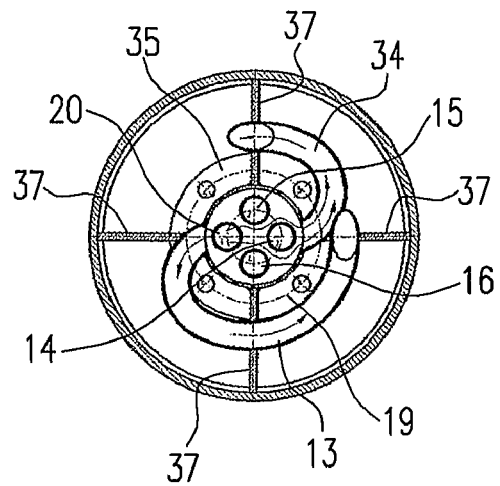
FIG. 4 a section along the line IV-IV from FIG. 3.
Figure 5:
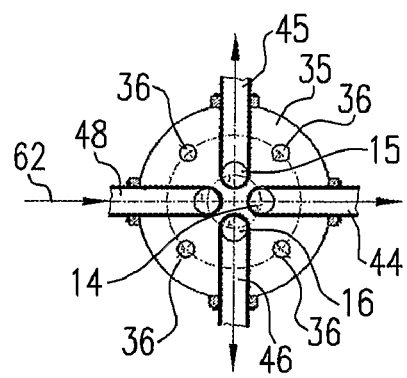
FIG. 5 a section along the line V-V from FIG. 1.
Figure 6:
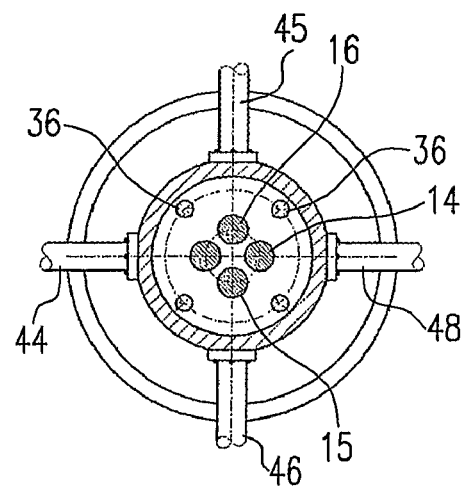
FIG. 6 a section along the line VI-VI from FIG. 3.

FIGS. 4 to 6 show various sections through FIGS. 1 and 3 corresponding to IV, V and VI.

FIG. 4 shows the container 7 at its lower end, whereby it is closed by a bottom plate 35. In the bottom plate a row of holes or outlet openings 36 are arranged. Sand with, where applicable, water flows from them, see also FIG. 8. The bottom plate 35 here encloses the vertical pipe 19 which extends from the bottom plate vertically upwards. The delivery lines 14, 15 and 16 and the fluid feed line 20 can be seen in the vertical pipe 19 in FIG. 4.

As already explained, the fluid feed line 20 opens into pipe section 23, whereby this section is joined to the discharge lines 13 and 34. These discharge lines extend radially outwards and wind in a spiral shape upwards, see also FIG. 3.

In FIG. 4 the blade segments 37 can be seen which also protrude radially outwards and are arranged with equal spacing in the circumferential direction and which extend to the inner side of the container wall.

In FIG. 5 the transport lines 44, 45 and 46, brought out radially outwards, and the fluid well-hole line 48 can be particularly seen. The fluid 62 can be fed to the separation device 1 via the fluid well-hole line 48.

FIG. 6 corresponds to a view along the line VI-VI from FIG. 3 from below, so that transport line 44 and fluid well-hole line 48 are arranged exchanged in comparison to FIG. 5.

It can in particular be seen in which manner the various lines from outside are flange-joined in this section of the separation devices.

Figure 7:
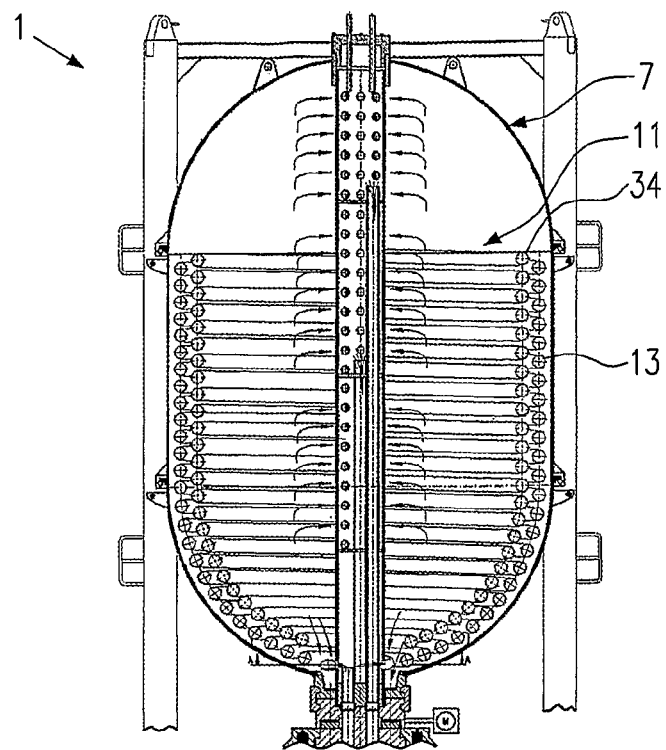
FIG. 7 a side view corresponding to FIG. 3 for a second embodiment.

FIG. 7 corresponds to another embodiment of the separation device 1 according to the invention, whereby it differs essentially only due to the different container shape from the embodiment according to FIG. 3. In FIG. 3 the container is essentially spherical, whereas the container 7 according to FIG. 7 exhibits essentially a cylindrical central section with hemispheres arranged at its ends. The corresponding classifier device 11 is arranged both in the cylindrical section and also in the lower hemisphere. The various pipe sections, see FIG. 8 in this respect, are formed in FIG. 7 with a longer length 32 so that accordingly a greater accommodation volume is available for the various fluid constituents.

The other details correspond to those according to FIG. 3 so that a repetition of the description is omitted.

FIG. 8 has already been mentioned in conjunction with FIG. 3. In addition it should be noted here that the blade segments 37, which exhibit approximately a quarter-circular shape, can also be formed with a semicircular shape, i.e. they can be mounted along an appropriate diameter of the blade segments on the vertical pipe 9. It must also be noted that the blade segments 37 according to FIG. 8 have a different shape in the embodiment according to FIG. 7, because they also extend along the central cylinder section to support the discharge lines 1.3, 34. This means that the quarter-circular shaped blade segments have essentially rectangular extensions in the embodiment according to FIG. 7, which extend along the vertical pipe 19.

With respect to the edge recess 40, which is open radially outwards, as openings 38 for the support of the discharge line it is pointed out that they are in the illustrated embodiment approximately semicircular. There is also the possibility that the openings are also circular, i.e. enclosed. Furthermore, the edge recesses can also be less than semicircular, so that they take up the discharge lines less than half.

FIG. 9 shows a diagram for describing the function and for describing the application of the separation device 1 according to the invention.

The appropriate container 7 is illustrated with a layer of the various constituents of sand, water, oil and gas. These constituents can be removed from the container 7 via rotary slide valves 42 and multibore connectors 43 arranged at the lower end of the container 7. Here, the constituents 2, 4 and 5, i.e. sand containing water, water and gas are transported over the corresponding transport lines 44, 45, 46 and 47, see also, for example, FIG. 2, to the flow control valves 49. These can be controlled or actuated via control elements 63 or actuators 63, whereby the control and actuation occurs through appropriate signals from a supply and control unit 58. From the flow control valves 49, the corresponding constituents are transported further to the throttle device 50 and/or metering valves 51, from where they are then fed back to the fluid extraction region via feedback lines 54. An appropriate electrical control device, initiators, actuators or similar equipment is, see reference symbol 63, for example also assigned to the rotary slide valves 42, the multibore connectors 43 and to the selector valves 59.

The fluid constituent to be actually conveyed, i.e. the oil 3, is passed via analogous devices to the pipeline 60 and from there to the water surface.

The two changeover valves 59 are illustrated in FIG. 9 and it can be seen that on closing the selector valve 59 assigned to the pipeline 60 and on opening the other changeover valve 59, feed of the fluid via the fluid well-hole line 48 to the separation device 1 occurs. With the failure, maintenance or similar activity on the separation device 1 the fluid can be conveyed directly without prior separation into fluid constituents via the pipeline 60 to the water surface by opening the changeover valve 59 assigned to the pipeline 60 and closing the other changeover valve.

The separation device 1 can be integrated according to the invention directly into an appropriate tree 55 on the sea bed, whereby this tree can be part of the tree 61 assigned to the well-hole 6 and another, reinjection tree, which is not shown. This reinjection tree is used for feeding back the fluid constituents of sand, water and gas into the extraction region to compensate for missing material or changing pressure due to the fluid extraction.

According to the invention, a separation device is therefore provided in which a fast and economical separation of the fluid into corresponding fluid constituents occurs, made possible with simple and constructive means, also without in particular rotating components of a separate classifier device. To this end, a combination of centrifugal and gravitational force is applied which acts on the various fluid constituents with different densities and separates them into layers within the container of the separation device. Both the feed of the fluid to be separated as well as the removal of the separated fluid constituents occurs directly into or out of the container so that the device overall is compact and consequently, for example, also easy to replace.

The invention claimed is:

1. A separation device for the separation of constituents of different density of well fluids from a well, the separation device including:
    a container having an inner wall;
    a feed line transporting the fluid into the container, the fluid flowing adjacent the inner wall and at least partially being separated in the container into its constituents using centrifugal force in the radial direction and/or using gravitational force in the vertical direction;
    a classifier device arranged in a lower section of the container having at least one discharge line extending in the radial direction outwards for the discharge of the fluid adjacent the inner wall of the container and causing the application of a centrifugal force on the fluid and a plurality of delivery lines joined to the container at different levels in the vertical direction to receive the separated fluid constituents;
    wherein the container is rotationally fixed with respect to the at least one discharge line;
    wherein the discharge line is in a generally spiral shape at least adjacent to its discharge opening;
    wherein the classifier device includes a vertical pipe having a plurality of inlets at different vertical levels and in communication with the respective delivery lines; and
    wherein each one of the plurality of delivery lines extends within the vertical pipe to one of the different vertical levels to receive a separated fluid constituent.

2. The separation device according to claim 1, wherein the discharge line extends radially outwards and vertically upwards with the shape of a spiral around the vertical pipe of the classifier device arranged centrally in the container.

3. The separation device according to claim 1 wherein a fluid line terminates within the vertical pipe and the fluid enters the discharge line from within the vertical pipe.

4. The separation device according to claim 1 wherein the vertical pipe is subdivided in the longitudinal direction into a plurality of pipe sections separated from one another, the fluid feed line terminating in a first lower pipe section and each of the further pipe sections above the first pipe section having at least one of the delivery lines terminating and communicating with the each of the further pipe sections.

5. The separation device according to claim 4 further including openings formed in a pipe casing of the vertical pipe at least in the region of the further pipe sections.

6. The separation device according to claim 1 further including two discharge lines extending from the vertical pipe and being generally coil shaped radially outwards and extending vertically upwards.

7. The separation device according to claim 1 wherein the discharge line has a number of openings on its outer side, generally in the radial direction.

8. The separation device according to claim 1 wherein the classifier device includes at least one blade segment protruding radially outwards from the vertical pipe supporting the at least one discharge line.

9. The separation device according to claim 1 wherein the container has a bottom plate enclosing the vertical pipe with outlet openings for at least the fluid constituent with the greatest density.

10. The separation device according to claim 1 wherein the delivery lines are within the vertical pipe and have generally vertically extending line sections which are connected to at least one rotary slide valve.

11. The separation device according to claim 4 wherein at least one level sensor is assigned to each pipe section.

12. The separation device according to claim 1 wherein at least one sensor device is disposed in an upper end of the container and/or the vertical pipe.

13. The separation device according to claim 1 further including at least one feedback line extending from the separation device.

14. The separation device according to claim 1 wherein the separation device is a replaceable part of a tree on the sea bed.

15. The separation device according to claim 1 wherein the separation device has a frame structure for mounting at least the container, lines, pumps, valves, throttles or similar equipment subsea.

16. The separation device according to claim 1 wherein the separation device is connected to an electrical supply and control unit positioned subsea adjacent the container.

17. The separation device according to claim 1 further including at least one changeover valve arranged in the feed line.

18. The separation device according to claim 1 further including a bypass pipeline that branches from the feed line.

19. The separation device according to claim 1 wherein the container is essentially spherical or silo-shaped.

20. The separation device according to claim 1 wherein the container is of modular construction.

21. A separator for separating the constituents of well fluids from a well, the separator comprising:
    a container housing a plurality of spiral tubes having at least one inlet and selected outlets, the container being rotationally fixed with respect to the plurality of spiral tubes;
    said at least one inlet receiving the well fluids and using centrifugal force in the radial direction to separate the constituents which exit the selected outlets into the container;
    the constituents separating in the container using gravitational force at different vertical levels in the container in accordance with their different densities;
    a vertical pipe including a plurality of discharge compartments arranged vertically within the pipe in accordance with the densities of the constituents;
    each discharge compartment communicating with a discharge pipe for removing a constituent from the container;
    wherein the vertical pipe includes a plurality of inlets at different vertical levels and in communication with the respective discharge pipes; and
    wherein each one of the plurality of discharge pipes extends within the vertical pipe to one of the different discharge compartments to receive a separated fluid constituent.

22. The separator of claim 21 wherein the container is integrated with a subsea tree.

23. The separator of claim 21 wherein the constituents include sand, water, and gas and further including a reinjection tree communicating with the discharge pipes whereby such constituents are reinjected into a reinjection well.

24. The separator of claim 22 further including rotary slide valves for controlling flow through the discharge lines.

25. The separation device according to claim 4 wherein the pipe sections may be different lengths.

26. The separation device according to claim 4 wherein the pipe sections are separated by intervening bottoms.

27. The separation device according to claim 8 wherein the blade segment has openings for the accommodation and/or mounting of the discharge line.

28. The separation device according to claim 27 wherein the openings are arranged along a radial outer end section of the blade segment.

29. The separation device according to claim 28 wherein the openings are formed as a partially open edge recess of the blade segment.

30. The separation device according to claim 10 further comprising transport lines and wherein the line sections following the rotary slide valve and using a multibore connector can be connected to the transport lines for the further transport of the constituents of the well fluids.

31. The separation device according to claim 30 wherein the feed line is connected via the rotary slide valve and multibore connector to a well fluids line which feeds the well fluids from the well.

32. The separation device according to claim 30 wherein a flow control valve is arranged in one or more of the transport lines.

33. The separation device according to claim 32 wherein a throttle device and/or a metering valve follows the flow control valve.

34. The separator of claim 24 wherein the rotary slide valves are actuated electrically subsea.

* * * * *